Patented Aug. 15, 1950

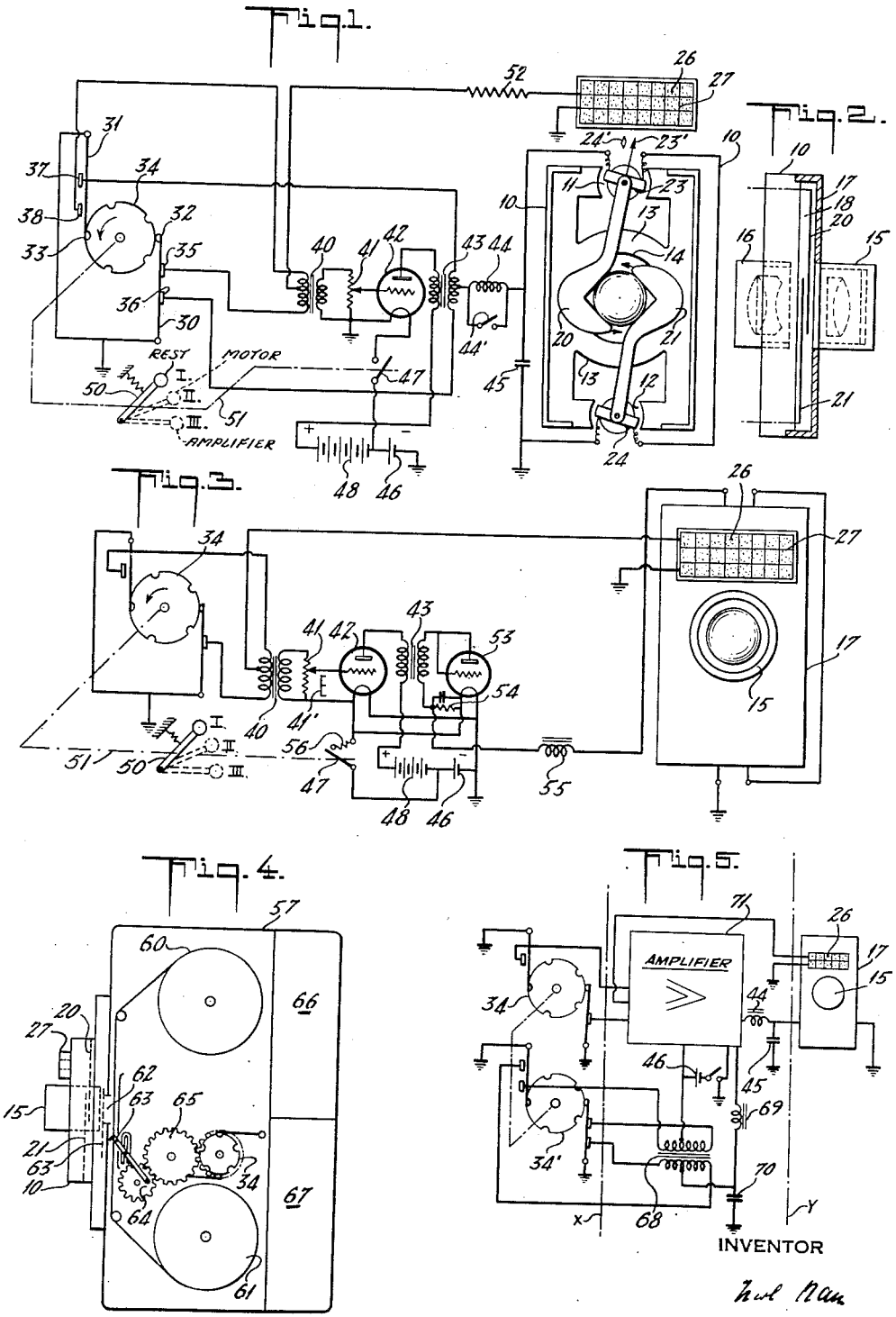

2,518,717

UNITED STATES PATENT OFFICE 2,518,717

AUTOMATIC EXPOSURE CONTROL SYSTEM IN A MOTION-PICTURE CAMERA

Karl Rath, New York, N. Y.

Application January 4, 1946, Serial No. 639,064

6 Claims. (Cl. 88—16)

This application is a continuation in part of my copending application Serial No. 535,242, filed May 12, 1944, entitled Exposure Control Device for Camera Diaphragms, now Patent No. 2,412,424.

My invention relates to automatic exposure control for cameras, more particularly, though not limitatively, to amateur moving picture cameras provided with an automatic iris controlled in accordance with the current generated by a photovoltaic cell in accordance with varying scene or subject brightness conditions.

An object of the invention is to provide a simple combined electric iris control and lens mount suitable for structural incorporation in small portable cameras, including those of the miniature type for both still and moving picture photography.

Another object is the provision of an improved amplifying system especially suitable for moving picture cameras, for amplifying the relatively weak current produced by a photovoltaic cell to a value sufficient for operating an iris diapragm of compact and rugged construction.

Another object is to provide an automatic iris control correlated with the release member of a moving picture camera whereby to cause an automatic fade-in and fade-out effect of the picture.

Other objects and novel aspects of my invention will become more apparent from the following detailed description taken in reference to the accompanying drawings forming part of this specification, and wherein:

Figure 1 is a schematic diagram including an amplifying circuit of a complete exposure control system embodying the principles of the invention;

Figure 2 is a section view of the combined lens mount and iris control device shown in Figure 1;

Figure 3 is a diagram showing a modification of an exposure control system according to the invention;

Figure 4 is a schematic drawing of a moving picture camera illustrating by way of example a structural embodiment of the control device according to the invention; and Figure 5 is a further schematic diagram illustrating still another modification of the invention.

Like reference characters identify like parts in the different views of the drawings.

Referring more particularly to Figures 1 and 2, there is shown a combined iris control device and lens mount comprising a double T-shaped permanent magnet 10 provided with a pair of air gaps 11 and 12 in its outer arms and having a central yoke or connecting member 13. The latter is centrally perforated, as shown at 14, to serve as part of or support for the lens mount of the camera.

High quality lenses, in particular those of the anastigmat type, usually comprise two sections, i. e., a front section 15 and a rear section 16 as shown in the drawing, with the aperture control or iris diaphragm arranged between said sections to avoid optical distortion or aberration. According to the present invention, as shown more clearly in Figure 2, the rear lens section is directly mounted in the central yoke 13 of the magnet 10 such as by a screw mount, while the front section 15 is mounted upon a separate plate or cover 17 removably secured to the magnet 10 and providing an enclosed space 18 for two or more diaphragm leaves or blades 20 and 21 intercepting the light passage through the lens and adapted to control the lens aperture, i. e., the amount of light passing through the lens in the manner more clearly described in the following.

The leaves 20 and 21 shown in the zero or open position so as to completely expose the lens are provided with extensions having their ends secured to the shafts of electrical moving coils 23 and 24 pivotally mounted within the air gaps 11 and 12, respectively, of the magnet 10 in a manner well understood from the construction of a permanent-magnet type direct current milliammeter. The moving coils 23 and 24 are connected to stationary terminal posts by way of suitable flexible conductors such as through the usual torsion control springs for the coils in a manner well known. If an electric current is passed through the coils 23 and 24, either in series as shown or in parallel, the coils will be deflected, the polarity or sense of winding being such that the leaves 20 and 21 will rotate toward each other in opposite directions so as to cause a decrease of the aperture or lens opening as a result of the varying overlap of the inner rectangular or otherwise shaped cut-outs, as readily understood from the drawing.

There is thus provided by the invention a highly compact and rugged combined lens mount and electric iris control device suitable for structural incorporation in small portable cameras for both still and moving picture photography.

There is furthermore shown in Figure 1 a photovoltaic cell 26 suitably mounted upon the camera and provided with acceptance angle limiting means such as a cellular baffle or grille 27 to admit light emanating only from the scene being photographed encompassed by the lens view angle of the camera (about 25° or less for the average moving picture camera). A photovoltaic cell such as a selenium-on-iron type or copper-cupreous oxide type cell of small size suitable for use in a portable hand camera, is capable of supplying only a small amount of electric energy or current normally insufficient for directly energizing a control device of the type shown of practical and rugged construction.

For the above reason, there is shown in Figure 1 a thermionic amplifier comprising one or more miniature electron tubes of about 1" or less dimension as used in miniature radio sets hearing aids, and the like, and means actuated by the spring motor of a standard moving picture camera for transforming the direct current supplied by the photovoltaic cell into an alternating current suitable for easy and efficient amplification by the thermionic amplifier. Efficient and reliable direct current amplification of the photoelectric current supplied by a photo-voltaic cell has been found to be extremely difficult, if not impossible to achieve in most cases, due to the small amounts of currents or voltage involved.

There is shown for the above purpose in Figure 1 a combined current interrupter and synchronous rectifier operated by the spring motor of a moving picture camera and comprising in the example illustrated a pair of leaf springs 30 and 31 having their one ends fixedly mounted, cantilever-fashion, and having their opposite ends provided with knobs or protuberances 32 and 33 adapted to engage peripheral depressions of an interrupter wheel or disk 34 suitably driven by the spring-motor of the camera during the taking of a picture, as indicated by the arrow in the drawing. Springs 30 and 31 are shown to be connected to ground, i. e., the metal casing of the camera, and are provided with pairs of cooperating stationary contacts 35, 36 and 37, 38, respectively. Furthermore, the depressions in the disks 34 are so arranged that one of the springs (30) as shown closes its contacts, while the contacts of the other spring (31) are in open-circuit position.

Contact 35 of spring 30 and contact 38 of spring 31 are connected to the opposite ends of the primary winding of a low frequency iron-core transformer 40 having a tapped center terminal which is connected to one of the terminals of the photovoltaic cell 26, the remaining terminal of the cell being grounded as shown. In this manner, current produced by the photovoltaic cell is passed alternately through the opposite halves of the primary of transformer 40, whereby to generate an alternating voltage in the secondary winding of sufficient magnitude for exciting the grid or input circuit of a standard three- or multi-electrode electron tube amplifier 42. An adjustable input potentiometer 41 serves as a volume or gain control in a manner well understood. The amplified alternating current in the output circuit of the tube 42 is rectified by the provision of an output transformer 43 having a secondary winding whose opposite ends are connected to the contact 36 of spring 30 and to contact 37 of spring 31, respectively. The rectified output current of substantially amplified magnitude is derived in a known manner from the center tap of the secondary winding of the output transformer 43 and passed through the moving coils 23 and 24 in series and back to the springs 30 and 31 by way of the ground connection or metal casing of thes camera. In order to reduce or eliminate the ripples or alternating current pulsations, the rec- tified current is sufficiently smoothed by the provision of a series inductance 44 and shunt condenser 45 in a manner well known in the art.

The cathode of the amplifier 42 is shown to be heated by a low-voltage battery 46 of the known flashlight type while the anode current is supplied by a high-voltage battery 48 of small dimensions commonly used in hearing aid and similar devices.

In order to connect and disconnect the amplifier, there is provided a switch 47 in the cathode heating circuit. According to an improved feature of the invention, switch 47 is suitably coupled or its operation correlated with the release member or lever 50 of the camera as indicated by the dot-dash line 51. In the normal or non-use position of the camera, the lever 50 is in the fullline position I. If it is desired to take a picture, the lever is depressed, passing through a position indicated at II to the final position indicated at III. Upon reaching position II, the spring motor is released, thus starting the operation of the camera and rotation of the interrupter disk 34. Continued movement of the lever results in a closing of the amplifier switch 47 in the final position III and subsequent operation of the diaphragm from its fully opened or normal position to a position of reduced aperture depending upon the intensity of the light impinged upon the photovoltaic cell 26 in accordance with the existing scene brightness. The moving coils 23 and 24 of the iris control are advantageously provided with sufficient mechanical damping to assist both in the smoothing of the alternating current ripples, on the one hand, and to provide a gradual closing of the diaphragm upon connection of the amplifier in such a manner as to result in a gradual fade-in of the picture and, similarly, a gradual picture fade-out upon release of the lever 50.

As is well known, the current generated by the photovoltaic cell varies substantially linearly with the light intensity provided the load circuit connected to the cell includes only a small resistance or is practically short-circuited across the cell, as in the arrangement described. On the other hand, the movement of the diaphragm leaves 20 and 21 should be of a non-linear (logarithmic) relation, i. e., to become less and less as the aperture is decreased in order to provide a direct relation between the amount of light passing through the lens and the scene brightness or intensity of the light rays impinged upon the photovoltaic cell. Such a relation between the variation of light intensity and the iris adjustment can be obtained in a simple manner by suitably shaping the pole pieces of the magnet so as to obtain an increasingly smaller movement as the deflection of the moving coils increases. Alternatively, a high ohmic resistance 52 of several thousand ohms may be connected in series with the photovoltaic cell 26, resulting in a change of of the response characteristic from a linear to a substantially logarithmic shape to provide a proper correlation with aperture control.

In place of a mechanical synchronous rectifier, a thermionic rectifier may be used as shown in the modification according to Figure 3. In the latter, the amplified alternating current is applied by the output transformer 43 to a diode 53 in series with a condenser-shunted load resistance 54. From the latter, the amplified direct current is derived through a smoothing choke coil 55 to operate the iris diaphragm in a manner similar to that according to Figure 1. Tube 53 may be in the form of a triode similar to tube 42 but with its grid and plate tied together to serve as a diode, as shown in the drawing.

The output current may be controlled by adjusting the potentiometer 41 in order to consider additional exposure-controlling factors such as varying film speed or different numbers of frames per second in case of a moving picture camera. For this purpose, the adjustable contact of the potentiometer or volume control 41 is shown associated with a suitable adjusting scale 41' representing different film or shutter speeds in a manner well understood by those skilled in the art.

Furthermore, in order to secure a more gradual fade-in or fade-out effect, the amplifier switch 47 may be combined with a fading resistance 56, as shown in Figure 3, to cause a gradually increasing or decreasing cathode heating current as the release lever is moved to or from the picture-taking position.

The degree of the fade-in or fade-out is determined both by the inertia of the iris movement and by the electric time constant of the smoothing filter 44, 45, Figure 1. According to a further feature of the invention, provision is made for obtaining short and long fading periods by means of a separate switch 44' serving to short-circuit a part or all of the winding turns of the smoothing choke 44, as shown in the drawing. This will alter the time constant of the circuit and accordingly the fading time. Alternatively, the fading time may be varied by the speed of operating the fading resistance 56 in Figure 3 when moving the release lever 50, Figure 1, between the positions II and III.

In Figure 4 I have shown schematically a moving picture camera of standard construction comprising a body or case 57, supply and take-up film spools 60 and 61, respectively, a film gate 62, rotating shutter 63' and a pull-down claw 63 operated by a rotating cam or disk 64 suitably driven by the spring-motor of the camera.

The interrupting or contact disk 34 is shown to be driven by the disk 64 through an intermediate gear 65 or in any suitable manner. Spaces 66 and 67 are shown provided at the rear of the camera to house the amplifier and batteries, respectively, the latter being automatically connected and disconnected by the provision of contacting springs or the like, as is customary in flashlights or similar devices involving removable current sources. The combined iris control and lens mount and photovoltaic cell are shown mounted upon the front of the camera in a manner well understood and indicated by the same reference numbers as used in the preceding illustrations.

According to a further modification of the invention, the relatively heavy high voltage or anode battery may be dispensed with in order to further reduce the size and bulk of the camera. For this purpose a portion of the heating battery current is utilized for energizing a separate synchronous interrupter and rectifier comprising an interrupting disk 34' also driven by the spring motor of the camera, a step-up transformer 68, smoothing choke 69 and smoothing condenser 70 in a manner well known and readily understood from the drawing. The remaining parts shown including amplifier 71 shown in block diagram form are substantially similar to those according to the previous modifications.

An arrangement according to the invention may also be employed in an exposure control system according to the parent application by combining the amplifier, transformers and other parts between the dot-dash lines $x$ and $y$, Figure 5, in a separate wearable unit different from the camera and connectable to and disconnectable from the camera through a flexible cord including the necessary connecting leads. In the latter case, suitable shielding between the interrupting circuit of the high voltage converter from the input of the amplifier should be provided to avoid interference with the amplifier operation. Alternatively, an electromagnetic self-interrupter for the high voltage converter operated by the cathode heating current may be provided in a device of this type incorporated in the separately wearable unit, as is understood and described in more detail in the parent application.

In order to apprise the operator of the actual adjustment or numerical adjustment of the diaphragm aperture, one of the moving coils 23 and 24 is suitably provided with a pointer as shown at 23' in Figure 1 cooperating with a scale of aperture openings. The latter is advantageously so arranged as to be visible in the view-finder of the camera during the taking of the picture. Furthermore, a limit mark 24' may be provided representing the lowest brightness under which a well-exposed picture may be expected for a given film speed. This will afford additional safety and result in a substantial saving of film due to adverse lighting conditions. For other film speeds, either a plurality of suitably identified limit marks may be provided, or a single mark 24' as shown in Figure 1 may be adjustable preferably simultaneously with the film speed setting by means of potentiometer 41 and a suitable coupling connection therebetween and the limit mark operating member.

Although a single stage amplifier has been shown in the drawing, it is understood that two or more amplifying stages may be employed to obtain a final output current of a desired intensity, said amplifying stages being coupled either by transformers or resistance coupling arrangements in a manner well understood in the art.

Furthermore, in place of the double contact interrupter and center tap transformer as shown in the drawings, one of the contact springs and its associated contact, shown in Figure 3, may be dispensed with, in which case the photovoltaic cell 26 is directly connected across the primary of the input transformer 40 in series with the single contact interrupter. By properly stepping up the speed of the interrupter disk 34 by means of the gear 65, Figure 4, and by using a suitable number of interruptions per revolution, a sufficiently high interrupting frequency up to several hundred cycles per second can be easily obtained so as to enable the use of relatively small and light smoothing devices.

According to a further feature of the invention, any other suitable interrupting means operated by the spring motor of the camera may be employed for converting the low voltage direct current supplied by a photovoltaic cell into high voltage alternating current suitable for efficient amplification by a standard thermionic amplifier. Thus, the motor of the camera may drive a suitable sector-shaped shutter or perforated disk type light chopper mounted in top of a photovoltaic cell to periodically interrupt the light beam impinged thereon and to result in a conversion of the output from direct to alternating current in a manner well known and understood. Use of the spring motor of the camera for operating the interrupting device according to the invention not only results in a considerable simplification and saving of parts, but provides an automatic correlation of the amplifier operation with the operation of the camera in the manner understood from the above.

Furthermore, it will be understood that the invention is not limited to the specific type of electric iris shown and described but may be used in connection with any electric light control or exposure device operated by the output current of the amplifier. Thus, for example, the light control device may be in the form of a neutral density filter carried by the pointer or needle of an electric instrument and variably interrupting the light beam passing through the lens of the camera. Such a construction has special practical application in case of small picture-size fixed-focus cameras, in particular 8 mm. moving picture cameras, wherein an aperture control to regulate the depth of focus is unnecessary and the picture area is small enough to enable the use of a light control variable density filter of small size. The latter may consist of a thin sheet of Celluloid or the like attached to the end of the instrument pointer or needle and arranged to intercept the light beam passing through the camera lens.

According to another modification of the invention, the actuating device for the iris or other light control element may be in the form of an alternating current electrical instrument such as of the magnetic vane or induction type, in which case a special rectifier between the amplifier and the control device may be dispensed with, resulting in further simplification of the apparatus.

While I have shown and described a few desirable embodiments of my invention, it is understood that this disclosure is for the purpose of illustration and that various changes in shape, proportion and arrangement of parts, as well as the substitution of equivalent elements for those herein shown and described may be made without departing from the spirit and scope of the invention as defined in the appended claims. The specification and drawing are accordingly to be regarded in an illustrative rather than a limiting sense.

I claim:

1. In a motion picture camera comprising a lens, a motor, film advancing and shutter means operated by said motor for exposing a film by the image formed by said lens and control means actuatable by electric current for varying the amount of light passing through said lens, photoelectric means mounted upon said camera for producing a direct photoelectric current of varying intensity in accordance with the brightness of a scene being photographed in the picture taking position of said camera, periodic current interrupting means having interrupting elements separate from said camera and operated by said motor for converting said direct current into alternating current, and an alternating current amplifier having an input circuit connected to said photoelectric means and interrupting means and having an output circuit energising said control means, whereby to adjust said control means in response to variations of said photoelectric current and to maintain a substantially constant exposure of said film under varying scene brightness conditions.

2. An arrangement as claimed in claim 1 including rectifying means connected between said amplifier and said control means.

3. An arrangement as claimed in claim 1 including a mechanical rectifier having interrupting contacts operated by said motor and connected between said amplifier and said control means.

4. An arrangement as claimed in claim 1 including low and high voltage power supply means for said amplifier being constituted by a direct current low voltage source and a direct current transformer connected to said source and comprising a synchronous interrupter and rectifier operated by said motor.

5. In a motion picture camera comprising a lens, a motor, film advancing and shutter means operated by said motor for exposing a film by the image formed by said lens and control means actuatable by electric current for varying the amount of light passing through said lens, photoelectric means mounted upon said camera for producing a direct photoelectric current of varying intensity in accordance with the brightness of a scene being photographed in the picture taking position of said camera, periodic current interrupting means having interrupting elements separate from said camera and operated by said motor, for converting said direct current into alternating current, an alternating current amplifier having an input circuit connected to said photoelectric means and interrupting means and having an output circuit energising said control means, whereby to adjust said control means in response to variations of said photoelectric current and to maintain a substantially constant exposure of said film under varying scene brightness conditions, a switch for connecting and disconnecting said amplifier, release means for starting and stopping said motor, and positive coupling means between said switch and said release means to first start said motor and subsequently close said switch upon operation of said release means from its rest position to its operating position and to first open said switch and subsequently stop said motor upon return of said release means from its operating to its rest position.

6. An arrangement as claimed in claim 5 including rectifying and filter means connected between the output circuit of said amplifier and said control means, and further means for adjusting the time constant of said filter means.

KARL RATH.

REFERENCES CITED

The following references are of record in the file of this patent:

UNITED STATES PATENTS

| Number | Name | Date |
| --- | --- | --- |
| 947,490 | Gwozdz | Jan. 25, 1910 |
| 1,934,484 | Camilli | Nov. 7, 1933 |
| 2,058,532 | Tuttle | Oct. 27, 1936 |
| 2,124,889 | Murray | July 26, 1938 |
| 2,129,562 | Brueck | Sept. 6, 1938 |
| 2,206,086 | Galyon | July 2, 1940 |
| 2,261,532 | Tonnies | Nov. 4, 1941 |
| 2,297,262 | Tonnies | Sept. 29, 1942 |
| 2,413,349 | Hancock et al. | Dec. 31, 1946 |

FOREIGN PATENTS

| Number | Country | Date |
| --- | --- | --- |
| 219,160 | Switzerland | May 31, 1942 |

OTHER REFERENCES

Henney, Kieth, Electron Tubes in Industry, McGraw-Hill Book Company, 1937 edition, pages 311 and 346.